United States Patent [19]

Fernando

[11] Patent Number: 4,985,765
[45] Date of Patent: Jan. 15, 1991

[54] METHOD AND APPARATUS FOR PICTURE MOTION MEASUREMENT WHEREBY TWO PICTURES ARE CORRELATED AS A FUNCTION OF SELECTIVE DISPLACEMENT

[75] Inventor: Gerard M. X. Fernando, Croydon, England

[73] Assignee: U. S. Philips Corporation, New York, N.Y.

[21] Appl. No.: 388,422

[22] Filed: Aug. 2, 1989

[30] Foreign Application Priority Data

Sep. 5, 1988 [GB] United Kingdom ............... 8820838

[51] Int. Cl.⁵ ............................................. H04N 7/01
[52] U.S. Cl. ..................................... 358/105; 358/140
[58] Field of Search ............... 358/105, 140, 138, 135, 358/136, 180

[56] References Cited

U.S. PATENT DOCUMENTS 4,864,394 9/1989 Gillard ............................... 358/105

FOREIGN PATENT DOCUMENTS 2188510 9/1987 United Kingdom .

Primary Examiner—Victor R. Kostak
Attorney, Agent, or Firm—Michael E. Marion

[57] ABSTRACT

A region from two frames of a television picture is subjected to Fourier transform in processing stages (3 and 4) one via a picture memory (2), and the resulting transforms compared in a comparator (5) whose output is subjected to inverse Fourier transform in a processing stage (6). The output of comparator (5) is also applied to a sample rate modifier (7) in which this output is enlarged prior to being subjected to inverse Fourier transform in a further processing stage (8). The outputs of processing stages (6 and 8) are respectively low and higher correlation functions to one pixel and one-quarter pixel resolution respectively. A given number, say 20, of sample points of greatest magnitude in the low resolution correlation function are selected in a largest vector selector (9) whose coordinates are used in a peak locator (10) which locates the peaks in the higher resolution correlation function associated with the selected samples to produce coordinates for these peaks to quarter pixel accuracy. A limited number of these, say 10, can be selected by a vector limiter (11) if used with a system having limited data capacity for motion vectors.

15 Claims, 2 Drawing Sheets

METHOD AND APPARATUS FOR PICTURE MOTION MEASUREMENT WHEREBY TWO PICTURES ARE CORRELATED AS A FUNCTION OF SELECTIVE DISPLACEMENT

BACKGROUND OF THE INVENTION

The present invention relates to a method of picture motion measurement and in particular to a method in which two pictures are correlated to determine correlation as a function of selective displacement. The invention also relates to apparatus for use with such a method.

A method of the above type is described in U.K. Pat. Application No. GB 2188510A which is particularly concerned with the generation of motion vectors for television pictures. In the field of High Definition Television (HDTV) such motion vectors are conveyed with a television signal and are used to produce at a receiver an enhanced display either by assisting in producing additional lines to those in the received signal or in producing additional fields between those in the received signal. In order to improve the resolution at the display it is preferable if the location of the motion vectors can be identified to sub-pixel accuracy.

SUMMARY OF THE INVENTION

It is an object of the present invention to provide a method of the above type and apparatus in which the locations and hence resulting motion vectors can be identified to sub-sample accuracy.

The invention according to a first aspect provides a method of picture motion measurement for the production of motion vectors, said method being characterized by the steps of:

(i) correlating two pictures to determine low resolution correlation as a function of displacement thereby to determine sample correlation values to a low resolution.

(ii) correlating said two pictures to determine higher resolution correlation as a function of displacement thereby to determine sample correlation values to a higher resolution, (iii) determining the locations of a given number of sample points of greatest magnitude in said low resolution correlation function, (iv) applying the locations found for said given number of sample points to said higher resolution correlation function to identify the corresponding sample points in said higher resolution correlation function, (v) determining the positions of peaks associated with the said number of sample points in said higher resolution correlation function which positions are defined to sub-sample interval accuracy.

Such a method has the advantage that it is much easier to identify the position of samples of greatest magnitude in the low resolution correlation function before identifying the locations of the peaks in the higher resolution correlation function.

The method may be additionally characterized by selecting from the positions of the peaks so found up to a limited number, which limited number is less than the said given number, of said positions whose coordinates form the motion vectors. This is particularly important when there are more peaks in the correlation function representing motion vectors than it is possible to transmit due to system capacity.

Where the method is used with a high definition television system it may be further characterized by the sample points in the low resolution correlation function having an interval of one pixel while sample points in the higher resolution correlation function have an interval of one quarter of a pixel.

In a preferred embodiment the positions of the peaks in the higher resolution correlation function may be found by examining the gradients of the functions about the given number of sample points.

The invention also provides apparatus for use with the above method. Apparatus for picture motion measurement according to a second aspect of the invention may be characterized in that it comprises means for correlating two pictures to determine low resolution correlation as a function of displacement thereby to determine sample correlation values to a low resolution, means for correlating said two pictures to determine higher resolution correlation as a function of displacement thereby to determine sample correlation values to a higher resolution, means for determining the locations of a given number of sample points of greatest magnitude in said low resolution correlation function, means for applying the locations found for said given number of sample points to said higher resolution correlation function to identify the corresponding sample points in said higher resolution correlation function, and means for determining the positions of peaks associated with the said number of sample points in said higher resolution correlation function which positions are defined to sub-sample interval accuracy.

The apparatus may be further characterized in that it may comprise means for selecting from the positions of the peaks so formed up to a limited number which limited number is less than said given number, of said positions whose coordinates form the motion vectors.

BRIEF DESCRIPTION OF THE DRAWINGS

The above and other features of the invention will now be described, by way of example, with reference to the accompanying drawings, in which.

DETAILED DESCRIPTION OF THE INVENTION

Figure 1:
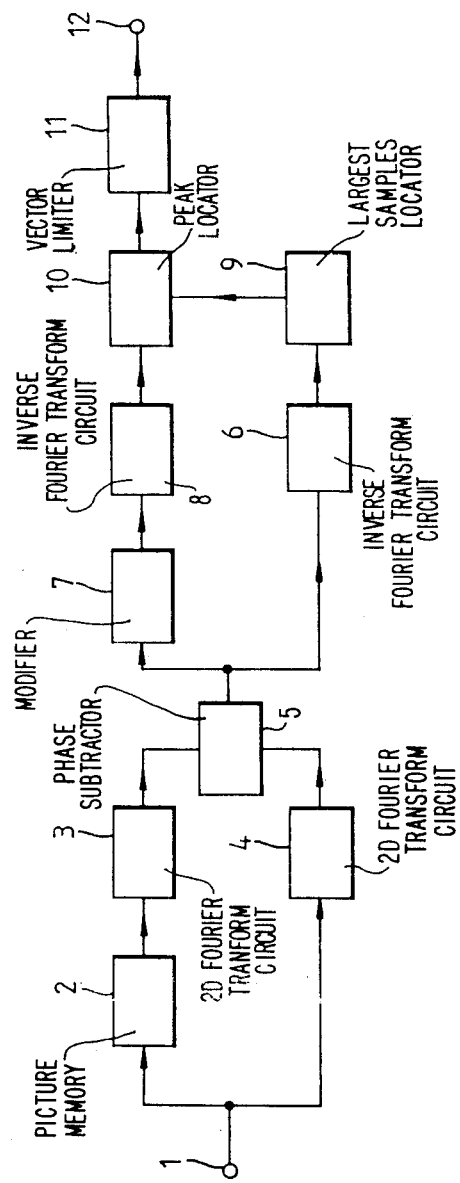
FIG. 1 is a block diagram of apparatus for use with the invention.
Figure 2:
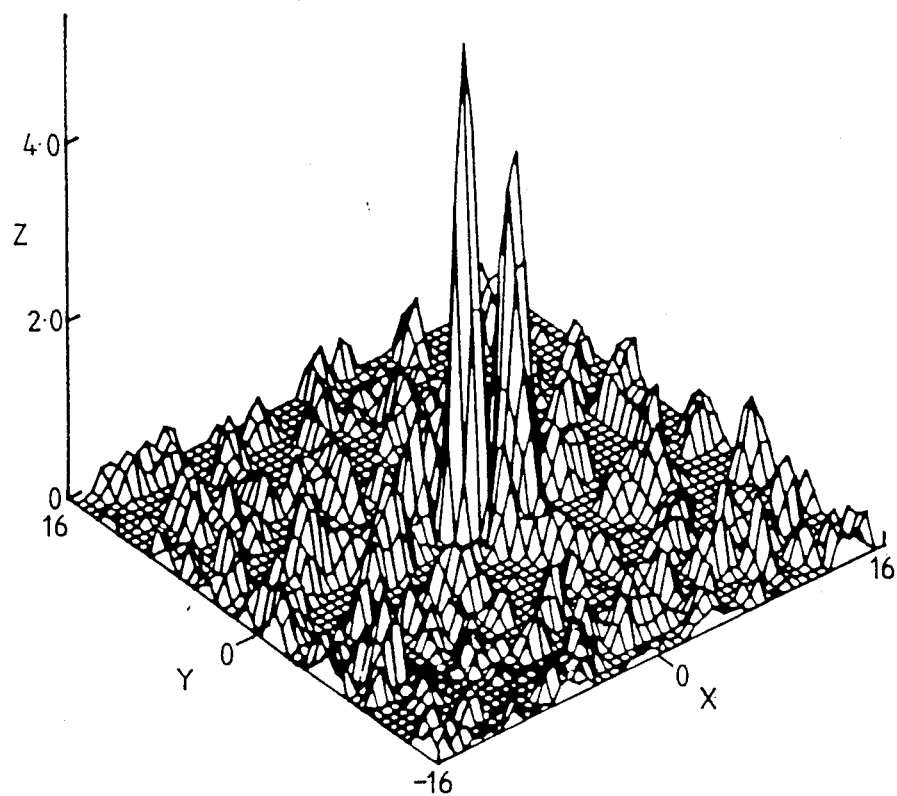
FIG. 2 is a correlation surface of the same region from adjacent frames of a television picture.

FIG. 1 shows a block diagram of apparatus which may be used for performing the method of the present invention. Such apparatus would in general be located with the signal processing equipment at the transmission side in the case of television signals but it is also possible, though less economic, for such apparatus to be located in television receiving apparatus. In FIG. 1 the reference 1 indicates an input terminal to which a luminance signal is applied either frame by frame or region by region. This luminance signal is applied to a picture memory 2 in which the luminance signal is delayed by a frame period which delayed luminance output is applied to a processing stage 3 where it is subjected to a two dimensional Fourier transform. The luminance signal at input terminal 1 is also applied directly to a second processing stage 4 in which the undelayed luminance is similarly subjected to a two dimensional Fourier transform. The resulting transformed information is applied to a phase subtractor 5 which establishes the difference in phase between its two inputs and applies this to a third processing stage 6 whose output is the inverse Fourier transform. This output is a correlation function as illustrated by the typical correlation surface as shown in FIG. 2 though in practice it would not appear as a continuous correlation surface but as a series of discrete samples of given magnitudes spaced one sample interval apart. The output of processor stage 6 is a low resolution correlation function where the sample interval is one pixel. It is assumed that the correlation surface of FIG. 2 is derived from a region of a television picture which is 32 pixels by 32 lines and thus the displacement in the X and Y directions of FIG. 2 run from −16 to +16 sample positions. Zero displacement represents lack of movement and the peaks located away from the zero displacement position indicate varying degrees of movement in the region.

The output of phase subtractor 5 is also applied to a sample modifier 7 which enlarges this output and this may be achieved by by the technique known as "padding with zeros". The resulting enlarged output from modifier 7 is applied to a fourth processing stage 8 whose output is the inverse Fourier transform of the enlarged signal from modifier 7 and is an enlarged correlation function which would be similar to the correlation surface of FIG. 2 with the peaks more accurately defined. As for processing stage 6, the correlation function produced by processing stage 8 is not a continuous surface but a series of discrete samples of given magnitudes though in this case these samples are spaced one quarter of a pixel apart and is thus a higher resolution correlation function than that from processing stage 6.

The low resolution correlation function from processing stage 6 is applied to a largest samples locator 9 which selects a given number, say 20, of the samples of greatest magnitude from the low resolution correlation function and identifies the locations of these selected samples. The locations for these 20 samples are applied to a peak locator 10 which also receives the higher resolution correlation function from the processing stage 8. Peak locator 10 identifies the corresponding samples in the higher resolution correlation function using the coordinates provided by the sample locator 9 and using the positions for these 20 samples searches for the locations of the higher resolution peaks associated with these corresponding samples. This can be achieved by making a "steepest ascent" search in which starting from a selected corresponding sample point the gradients between its adjacent quarter pixel interval samples are determined until the steepest gradient is established. This is repeated until the surrounding quarter interval sample points are lower in magnitude when the peak is located to quarter pixel accuracy. The coordinates for the peaks so found and their magnitudes may be applied to a vector limiter 11 in which up to a limited number, say 10, of the coordinates of the peaks of greatest magnitude are selected from those produced by the peak locator 10, this being preferable with television systems having a limited data capacity for the transmission of motion vectors. These coordinates thus form the limited number of motion vectors for a region which are applied to an output 12.

Although in the above the method of the invention is described as being carried out by apparatus units which have specified functions, it will be realized that the method may be performed by a microcomputer under dedicated software control. In addition, the correlation functions may be produced by a method other than that described such as optimal matching of the corresponding regions.

From reading the present disclosure, other modifications will be apparent to persons skilled in the art. Such modifications may involve other features which are already known in the design, manufacture and use of apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of picture motion measurement for the production of motion vectors, said method being characterized by the steps of:
   (i) correlating two pictures to determine low resolution correlation as a function of displacement thereby to determine sample correlation values to a low resolution,
   (ii) correlating said two pictures to determine higher resolution correlation as a function of displacement thereby to determine sample correlation values to a higher resolution,
   (iii) determining the positions of a given number of sample points of greatest magnitude in said low resolution correlation function,
   (iv) applying the positions found for said given number of sample points to said higher resolution correlation function to identify the corresponding sample points in said higher resolution correlation function,
   (v) determining the locations of peaks associated with the said number of sample points in said higher resolution correlation function which locations are defined to sub-sample interval accuracy.

2. A method as claimed in claim 1, wherein the locations of the peaks in said higher resolution correlation function are found by examining the gradients between adjacent higher resolution sample points starting from the said given number of corresponding sample points.

3. A method as claimed in claim 1, wherein sample points in said low resolution correlation function have an interval of one pixel while sample points in said higher resolution correlation function have an interval of one quarter of a pixel.

4. A method as claimed in claim 3, wherein the locations of the peaks in said higher resolution correlation are found by examining the gradients between adjacent higher resolution sample points starting from the said given number of corresponding sample points.

5. A method as claimed in claim 1, wherein said method additionally comprises selecting from the locations of the peaks so found up to a limited number, which limited number is less than said given number, of said locations whose coordinates form said motion vectors.

6. A method as claimed in claim 5, wherein sample points in said low resolution correlation function have an interval of one pixel while sample points in said higher resolution correlation function have an interval of one quarter of a pixel.

7. A method as claimed in claim 5, wherein the locations of the peaks in said higher resolution correlation are found by examining the gradients between adjacent higher resolution sample points starting from the said given number of corresponding sample points.

8. Apparatus for picture motion measurement, comprising means for correlating two pictures to determine low resolution correlation as a function of displacement thereby to determine sample correlation values to a low resolution, means for correlating said two pictures to determine higher resolution correlation as a function of displacement thereby to determine sample correlation values to a higher resolution, means for determining the positions of a given number of sample points of greatest magnitude in said low resolution correlation function, means for applying the positions found for said given number of sample points to said higher resolution correlation function to identify the corresponding sample points in said higher resolution correlation function, and means for determining the locations of peaks associated with the said number of sample points in said higher resolution correlation function which locations are defined to sub-sample interval accuracy.

9. The apparatus of claim 8 wherein the means for determining the locations of peaks associated with the said number of sample points in said higher resolution correlation function comprises means for examining the gradients between adjacent higher resolution sample points starting from said given number of corresponding sample points.

10. The apparatus of claim 8 wherein said sample points and said low resolution correlation function have an interval of one pixel while sample points in said higher resolution correlation function have an interval of one quarter of a pixel.

11. The apparatus of claim 10 wherein the means for determining the locations of peaks associated with the said number of sample points in said higher resolution correlation function comprises means for examining the gradients between adjacent higher resolution sample points starting from said given number of corresponding sample points.

12. Apparatus as claimed in claim 8, further comprising means for selecting from the locations of the peaks so formed up to a limited number, which limited number is less than said given number, of said locations whose coordinates form the motion vectors.

13. The apparatus of claim 12 wherein the means for determining the locations of peaks associated with the said number of sample points in said higher resolution correlation function comprises means for examining the gradients between adjacent higher resolution sample points starting from said given number of corresponding sample points.

14. The apparatus of claim 12 wherein said sample points and said low resolution correlation function have an interval of one pixel while sample points in said higher resolution correlation function have an interval of one quarter of a pixel.

15. The apparatus of claim 14 wherein the means for determining the locations of peaks associated with the said number of sample points in said higher resolution correlation function comprises means for examining the gradients between adjacent higher resolution sample points starting from said given number of corresponding sample points.

* * * * *